United States Patent
Kusano et al.

(10) Patent No.: US 7,410,223 B2
(45) Date of Patent: Aug. 12, 2008

(54) VEHICLE HYDRAULIC BRAKE DEVICE

(75) Inventors: Akihito Kusano, Kariya (JP); Satoshi Ishida, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 10/807,351

(22) Filed: Mar. 24, 2004

(65) Prior Publication Data

US 2004/0239177 A1 Dec. 2, 2004

(30) Foreign Application Priority Data

Mar. 26, 2003 (JP) ............... 2003-085596

(51) Int. Cl.
*B60T 8/36* (2006.01)
*B60T 17/00* (2006.01)

(52) U.S. Cl. .................. 303/119.2; 303/115.1; 303/15

(58) Field of Classification Search ............ 303/3, 303/5, 7, 11, 15, 155, 191, 115.1, 116.1, 303/119.1, 119.2, 115.4, 20, DIG. 1, 2, 4; 701/70, 78, 83
See application file for complete search history.

(56) References Cited

U.S. PATENT DOCUMENTS

| | | | | |
|---|---|---|---|---|
| 4,386,626 A | * | 6/1983 | Hehl | 137/529 |
| 5,031,968 A | | 7/1991 | Takata | |
| 5,048,292 A | * | 9/1991 | Kubik | 60/413 |
| 5,520,652 A | * | 5/1996 | Peterson | 604/119 |
| 5,727,852 A | | 3/1998 | Pueschel et al. | |
| 5,813,226 A | * | 9/1998 | Krone et al. | 60/327 |
| 6,078,858 A | * | 6/2000 | Tozu et al. | 701/79 |
| 6,199,964 B1 | * | 3/2001 | Ota et al. | 303/192 |
| 6,216,808 B1 | * | 4/2001 | Kuno et al. | 180/65.3 |
| 6,247,762 B1 | | 6/2001 | Kusano et al. | |

(Continued)

FOREIGN PATENT DOCUMENTS

DE  43 22 292 A1  1/1995

(Continued)

OTHER PUBLICATIONS

Official Action issued by Japanese Patent Office in JP 2003-085596 on Jul. 4, 2007, and English language translation.

(Continued)

*Primary Examiner*—Melody M Burch
(74) *Attorney, Agent, or Firm*—Buchanan Ingersoll & Rooney PC (57) ABSTRACT

A hydraulic brake device includes a hydraulic pressure supply passage for reducing the output hydraulic pressure by a first proportional solenoid valve and supplying it to a hydraulic passage leading from a pressure adjusting valve to the wheel cylinders, a second proportional solenoid valve disposed between the hydraulic pressure supply passage and the pressure adjusting valve for reducing the hydraulic pressure supplied from the hydraulic pressure supply passage, and a check valve parallel to the second proportional solenoid valve. Hydraulic pressure control during automatic brake control is carried out by the first and second proportional solenoid valves. When the brake pedal is operated during automatic brake control and output hydraulic pressure of the pressure adjusting valve exceeds hydraulic pressure in the hydraulic pressure supply passage by automatic brake control, the output hydraulic pressure of the pressure adjusting valve flows toward the hydraulic pressure supply passage through the check valve.

9 Claims, 4 Drawing Sheets

U.S. PATENT DOCUMENTS

| | | | |
|---|---|---|---|
| 6,349,995 B1 * | 2/2002 | Itoh et al. | 303/116.1 |
| 6,422,662 B1 * | 7/2002 | Haas | 303/155 |
| 6,739,293 B2 * | 5/2004 | Turner et al. | 123/90.12 |
| 6,957,871 B2 * | 10/2005 | Maki | 303/114.1 |

FOREIGN PATENT DOCUMENTS

| | | |
|---|---|---|
| JP | 2-225165 A | 9/1990 |
| JP | 2-299962 A | 12/1990 |
| JP | 6-329007 A | 11/1994 |
| JP | 8-230634 A | 9/1996 |
| JP | 11-139279 | 5/1999 |
| JP | 11-227586 A | 8/1999 |
| JP | 2000-168540 A | 6/2000 |
| JP | 2000-177562 A | 6/2000 |
| JP | 2002-145032 A | 5/2002 |

OTHER PUBLICATIONS

Official Action issued by German Patent Office in DE 10 2004 014 702.7-21on May 24, 2007, and English language translation.

* cited by examiner

VEHICLE HYDRAULIC BRAKE DEVICE

BACKGROUND OF THE INVENTION

This invention relates to a vehicle hydraulic brake device which permits automatic brake control, particularly to a vehicle hydraulic brake device which can reduce any change in deceleration when shifting from automatic brake control to normal braking without any reduction in safety.

A conventional vehicle hydraulic brake device which makes automatic brake control possible is disclosed in JP patent publication 11-139279.

The vehicle hydraulic brake device includes a hydraulic pressure source for generating a predetermined hydraulic pressure, a pressure adjusting valve for adjusting the output hydraulic pressure of the hydraulic pressure source to a value corresponding to the brake operating force, a master cylinder for producing brake hydraulic pressure by activating a master piston with the output hydraulic pressure of the pressure adjusting valve introduced into a pressure chamber, and the brake operating force, and wheel cylinders activated under the output hydraulic pressure from the master cylinder and imparting braking force to the respective vehicle wheels.

It further includes a solenoid valve for supplying the output hydraulic pressure of the pressure adjusting valve to hydraulic lines extending from the master cylinder to the wheel cylinders, a hydraulic pressure supply passage connected to a hydraulic passage connecting the pressure adjusting valve to the solenoid valve for supplying the output hydraulic pressure of the hydraulic pressure source to the hydraulic passage after reducing it by a first proportional solenoid valve, and a second proportional solenoid valve disposed between the hydraulic pressure supply passage and a reservoir to reduce the hydraulic pressure supplied from the hydraulic pressure supply passage, thereby carrying out automatic brake control.

In the vehicle hydraulic brake device as disclosed in JP patent publication 11-139279, if brake operation is performed by the driver during automatic brake control, it is necessary to detect the brake operating amount by means of a hydraulic pressure sensor for detecting the output hydraulic pressure of the master cylinder to change over from automatic brake control to normal braking. But it is difficult to change over to normal braking the moment the control hydraulic pressure by automatic brake control (hydraulic pressure of the wheel cylinders) becomes equal to the output hydraulic pressure of the master cylinder. There is some time lag in the changeover timing. As a result, deceleration may suddenly increase or decrease during such changeover, producing uncomfortable feeling during driving.

Also, if the hydraulic pressure sensor fails, even if the brake is operated, braking force will not increase because the output hydraulic pressure supply passage from the master cylinder will not open, so that braking force will be insufficient.

An object of this invention is to reduce any change in deceleration during changeover from automatic brake control to normal braking and to maintain high safety even if the hydraulic pressure sensor fails.

SUMMARY OF THE INVENTION

According to this invention, there is provided a vehicle hydraulic brake device comprising a hydraulic pressure source for generating and outputting a predetermined hydraulic pressure, a pressure adjusting valve for adjusting the output hydraulic pressure of the hydraulic pressure source to a value corresponding to a brake operating amount, and wheel cylinders actuated by the output hydraulic pressure of the pressure adjusting valve to impart braking force to wheels of the vehicle, further comprising a hydraulic pressure supply passage connected to a hydraulic passage leading from the pressure adjusting valve to the wheel cylinders, a first proportional solenoid valve provided in the hydraulic pressure supply passage for reducing the output hydraulic pressure of the hydraulic pressure source and supplying it to the hydraulic passage leading from the pressure adjusting valve to the wheel cylinders, a second proportional solenoid valve disposed between the hydraulic pressure supply passage and the pressure adjusting valve for reducing the hydraulic pressure supplied from the hydraulic pressure supply passage, a check valve provided parallel to the second proportional valve and allowing fluid flow from the pressure adjusting valve toward the hydraulic pressure supply passage, and a control means for controlling operations of the first and second proportional solenoid valves, wherein control of the hydraulic pressure supplied to the wheel cylinders during automatic brake control is performed by the first proportional solenoid valve and the second proportional solenoid valve.

The vehicle hydraulic brake device of this invention may be of a type comprising a hydraulic pressure source for generating and outputting a predetermined hydraulic pressure, a pressure adjusting valve for adjusting the output hydraulic pressure of the hydraulic pressure source to a value corresponding to a brake operating amount, a pressure chamber connected to the pressure adjusting valve, a master cylinder including a master piston actuated by the output hydraulic pressure of the pressure adjusting valve introduced into the pressure chamber or the output hydraulic pressure of the pressure adjusting valve introduced into the pressure chamber and the brake operating force for generating brake hydraulic pressure, and wheel cylinders actuated by the output hydraulic pressure of the master cylinder to impart braking force to wheels of the vehicle.

It may further include a solenoid valve for supplying the output hydraulic pressure of the pressure adjusting valve to a hydraulic system leading from the master cylinder to the wheel cylinder, a hydraulic pressure supply passage connected to a hydraulic passage connecting the pressure adjusting valve to the solenoid valve, a first proportional solenoid valve provided in the hydraulic pressure supply passage for reducing the output hydraulic pressure of the hydraulic pressure source and supplying it to the hydraulic passage connecting the pressure adjusting valve to the solenoid valve, a second proportional solenoid valve disposed between the hydraulic pressure supply passage and the pressure adjusting valve for reducing the hydraulic pressure supplied from the hydraulic pressure supply passage, a check valve provided parallel to the second proportional valve and allowing fluid flow from the pressure adjusting valve toward the hydraulic pressure supply passage, and a control means for controlling operations of the solenoid valve and the first and second proportional solenoid valves, wherein control of the hydraulic pressure supplied to the wheel cylinders during automatic brake control is performed by the solenoid valve and the first proportional solenoid valve and the second proportional solenoid valve.

Otherwise, it may further include a hydraulic pressure supply passage connected to a hydraulic passage connecting the pressure adjusting valve to the pressure chamber, a first proportional solenoid valve provided in the hydraulic pressure supply passage for reducing the output hydraulic pressure of the hydraulic pressure source and supplying it to the hydraulic passage connecting the pressure adjusting valve to the pressure chamber, a second proportional solenoid valve disposed between the hydraulic pressure supply passage and the pressure adjusting valve for reducing the hydraulic pressure supplied from the hydraulic pressure supply passage, a check valve provided parallel to the second proportional valve and allowing fluid flow from the pressure adjusting valve toward the hydraulic pressure supply passage, and a control means for controlling operations of the first and second proportional solenoid valves, wherein control of the hydraulic pressure supplied to the wheel cylinders during automatic brake control is performed by the first proportional solenoid valve and the second proportional solenoid valve.

In any of the above-described vehicle hydraulic brake devices, automatic brake control is stopped when the output hydraulic pressure of the pressure adjusting valve becomes equal to the hydraulic pressure in the hydraulic pressure supply passage. In order to see whether the former is equal to the latter, these hydraulic pressures may be detected directly by sensors, or may be indirectly compared with each other by detecting the brake operating amount which is relevant to the output hydraulic pressure of the pressure adjusting valve, and the control currents for the first and second proportional solenoid valves, which are relevant to the hydraulic pressure in the hydraulic pressure supply passage.

Automatic brake control may be stopped when the hydraulic pressures in the wheel cylinders detected by wheel cylinder pressure sensors exceed the hydraulic pressure controlled by the first and second proportional solenoid valves. In this case, too, the hydraulic pressures in the wheel cylinders may be detected directly or may be indirectly detected by detecting the deceleration or the hydraulic pressure in the hydraulic pressure supply passage, which are relevant to hydraulic pressures in the wheel cylinders. Also, the target wheel cylinder pressure in automatic brake control or the hydraulic pressure determined from the control current for the first and second proportional solenoid valves may be used as the hydraulic pressure controlled by the first and second proportional solenoid valves.

In the vehicle hydraulic brake devices according to this invention, when the brake is operated by the driver during automatic brake control and the output hydraulic pressure of the pressure adjusting valve becomes equal to or exceeds the hydraulic pressure in the hydraulic pressure supply passage, which is controlled by the first and second proportional solenoid valves, if there is no abnormality in the device, a command is given from the control means such as an electronic control unit to stop automatic brake control. At this time, when the output hydraulic pressure of the pressure adjusting valve exceeds the hydraulic pressure in the hydraulic pressure supply passage, which is controlled by the first and second proportional solenoid valves, the output hydraulic pressure of the pressure adjusting valve is introduced through the check valve, which is provided parallel to the second proportional solenoid valve, to the hydraulic pressure supply passage, so that braking force proportional to a value during normal braking will be produced. Thus, even if automatic brake control is stopped after the output hydraulic pressure of the pressure adjusting valve has exceeded the hydraulic pressure in the hydraulic pressure supply passage, which is controlled by the first and second proportional solenoid valves, no sudden change in the vehicle deceleration due to a delay in the stop timing will occur. This reduces the change in deceleration when transferring from automatic brake control to normal braking.

Also, even if the command for stop of automatic brake control is not produced when it should be produced e.g. due to failure of a hydraulic pressure sensor, since the output hydraulic pressure of the pressure adjusting valve is introduced to the hydraulic pressure supply passage through the check valve, braking force corresponding to a valve during normal braking is ensured, so that safety will not lower.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

The embodiments of the vehicle hydraulic brake device of this invention will be described with reference to the attached drawings.

Figure 1:
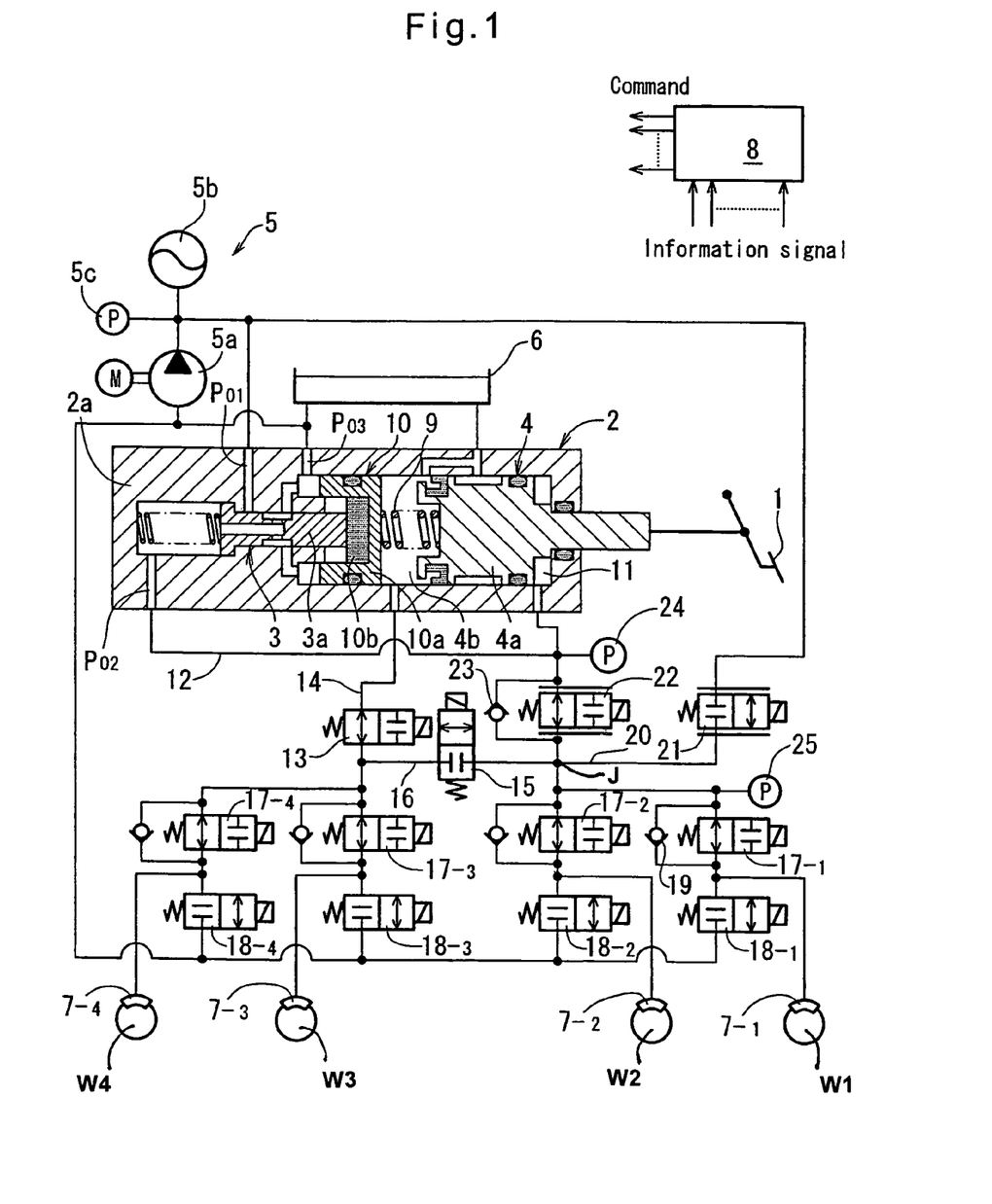
FIG. 1 is a view showing the first embodiment of the vehicle hydraulic brake device of this invention.

FIG. 1 shows the first embodiment which includes a brake pedal 1, a pressure adjusting device 2 comprising a pressure adjusting valve 3 and a master cylinder 4, a hydraulic pressure source 5 including a power-driven pump 5a, an accumulator 5b for storing the hydraulic pressure produced by the pump 5a, and a hydraulic pressure sensor 5c, an atmospheric reservoir 6 communicating with the inlet ports of the pump 5a and the master cylinder 4, wheel cylinders 7-1 to 7-4 for imparting braking force to the respective vehicle wheels W-1 to W-4, and an electronic control device 8 (ECU). In the hydraulic pressure source 5, when the hydraulic pressure detected by the hydraulic pressure sensor 5c becomes below a preset lower limit, a command is given from the electronic control device 8 to activate the pump 5a, and when the detected hydraulic pressure becomes above a preset upper limit, the pump 5a will stop. Thus, in a normal state, hydraulic pressure in a predetermined range is always stored.

The master cylinder 4 has a master piston 4a acted by the brake operating force from the brake pedal 1, and generates a brake hydraulic pressure by pressurizing brake fluid in a master hydraulic pressure chamber 4b with the master piston 4a.

The brake operating force applied to the master piston 4a is transmitted to the pressure adjusting valve 3 through a spring 9, brake hydraulic pressure in the master hydraulic pressure chamber 4b, and a distribution device 10.

The distribution device 10 has a rubber member 10b arranged in a cup-like piston 10a to transmit the advancing thrust produced in the piston 10a through the rubber member 10b to the pressure adjusting valve 3. In the initial stage of brake operation, the advancing thrust of the piston 10a is transmitted to the pressure adjusting piston 3 as it is. But, when the brake operating force exceeds a certain value, the rubber member 10b, which has elastically deformed and gotten into the gap inside the piston 10a, abuts a housing 2a of the pressure adjusting valve 2. Thereafter, only part of the piston thrust is transmitted to the pressure adjusting valve 3. Thus, using this function, it is possible to impart to the brake device jumping properties, which steepen the initial rise of the brake hydraulic pressure adjusted by the pressure adjusting valve 3 (that is, output hydraulic pressure of the pressure adjusting valve). It is also possible to replace the rubber member with one having different properties or size to change the relation between the brake operating force and the output hydraulic pressure. But the distribution device 10 is a mere preferable element.

The pressure adjusting device 3 shown is of a type in which changeover of connection of an output port P02 with an input port P01 or pressure reduction port P03, disconnection of the output port P02 from both of the input port P01 and pressure reduction port P03, and the adjustment of the degree of opening of the valve portion are all performed by the displacement of a spool 3a formed with an internal passage. Since this pressure adjusting valve 3, which adjusts the hydraulic pressure supplied from the hydraulic pressure source 5 to a value corresponding to the brake operating amount and outputs it, is already well known, its detailed description is omitted. The output hydraulic pressure of the pressure adjusting valve 3 is introduced through the output port P02 into a pressure chamber 11 provided behind the master piston 4a, and acts as an assisting force to amplify the brake operating force applied to the master piston 4a from the brake pedal 1. Under this amplified force, the master piston 4a will advance to generate brake hydraulic pressure corresponding to the brake operating amount in the master hydraulic pressure chamber 4b.

The output port P02 of the pressure adjusting valve 3 is connected through a hydraulic passage 12 to the wheel cylinders 7-1 and 7-2, which are in the first hydraulic line.

The master hydraulic pressure chamber 4b is connected through a hydraulic passage 14 having a normally open solenoid valve 13 to the wheel cylinders 7-3 and 7-4, which are in the second hydraulic line.

The hydraulic passages 12 and 14 are connected together through a hydraulic passage 16 having a normally closed solenoid valve 15. Thus, the output hydraulic pressure of the pressure adjusting valve 3 can also be supplied to the wheel cylinders 7-3 and 7-4 by opening the solenoid valve 15.

Solenoid valves 17-1 to 17-4 for performing pressure increase control of the respective wheel cylinders, solenoid valves 18-1 to 18-4 for performing pressure reduction control of the wheel cylinders are provided. The pressure increasing solenoid valves 17-1 to 17-4 accompany check valves 19 (numeral is attached to only one of them) which allow fluid flow from the wheel cylinder to the pressure adjusting device 2. These solenoid valves are used for adjustment of the braking forces for the individual wheels, such as pressure reduction and pressure re-increase in antilock control, which is performed based on information from e.g. wheel speed sensors (not shown) provided for the respective wheels.

To a hydraulic passage 12 leading from the pressure adjusting valve 3 to the wheel cylinders, a hydraulic pressure supply passage 20 is connected which is connected to the output side of the hydraulic pressure source 5 through a first proportional solenoid valve 21. The valve 21 serves to reduce the output pressure of the hydraulic pressure source 5 and supply it to the wheel cylinders 7-1 to 7-4.

Between the pressure adjusting valve 3 and a junction J between the hydraulic pressure supply passage 20 and the hydraulic passage 12 a second proportional solenoid valve 22 is provided to reduce the hydraulic pressure supplied to the wheel cylinders when necessary.

A check valve 23 is provided in parallel to the second proportional solenoid valve 22. The check valve 23 is oriented so as to allow fluid flow from the pressure adjusting valve 3 toward the junction J. A hydraulic pressure sensor 24 for detecting the output hydraulic pressure of the pressure adjusting valve 3, and a hydraulic pressure sensor 25 for detecting the hydraulic pressure of the wheel cylinders are provided.

This vehicle hydraulic brake device of FIG. 1 keeps the illustrated state while braking is not being performed.

When the brake is operated by the driver in this state, the master piston 4a will advance under the brake operating force, so that the brake hydraulic pressure is produced in the master hydraulic pressure chamber 4b. The brake hydraulic pressure is supplied to the wheel cylinders 7-3 and 7-4. The brake operating force applied to the master piston 4a is transmitted through the spring 9, brake hydraulic pressure in the master hydraulic chamber 4b and the distribution device 10 to the pressure adjusting valve 3. The brake hydraulic pressure is adjusted by the valve 3 and supplied to the wheel cylinders 7-1 and 7-2. At this time, the brake hydraulic pressure adjusted by the pressure adjusting valve 3 is introduced into the pressure chamber 11 and acts on the master piston 4a as an assisting force.

During such braking, if it becomes necessary to reduce the pressure for e.g. the wheel cylinder 7-1, the requirement is fulfilled by closing the solenoid valve 17-1 and opening the solenoid valve 18-1. If it becomes necessary to re-increase the pressure for the wheel cylinder 7-1, it is possible to supply hydraulic pressure for pressure re-increase from the pressure adjusting valve 3 by opening the solenoid valve 17-1 and closing the solenoid valve 18-1. If it becomes necessary to reduce and re-increase the pressure for the wheel cylinder 7-3, this requirement is fulfilled by performing similar control with the solenoid valves 17-3 and 18-3 with the solenoid valve 13 closed and the solenoid valve 15 open.

Next, automatic brake control such as vehicle stability control (VSC) or car-to-car distance control (ACC) is performed by opening the first proportional solenoid valve 21 with the solenoid valve 13 closed, the solenoid valve 15 open and the second proportional solenoid valve 22 closed under the command from the electronic control device 8. The proportional solenoid valves control a differential pressure between the upstream hydraulic pressure and the downstream hydraulic pressure to a value corresponding to a control current. The first proportional solenoid valve 21 can adjust the hydraulic pressure from the hydraulic pressure source 5 to a hydraulic pressure necessary in automatic brake control and supply it through the hydraulic pressure supply passage 20 to the wheel cylinders 7-1 to 7-4. If it becomes necessary to reduce the hydraulic pressure supplied to the wheel cylinders, this requirement is fulfilled by closing the first proportional solenoid valve 21 and opening the second proportional solenoid valve 22. During automatic brake control, brake operation is not done by the driver, and the hydraulic passage 12 is in communication with the atmospheric reservoir 6 through the pressure adjusting valve 3. Thus, it is possible to reduce pressure by means of the second proportional solenoid valve 22 to a value corresponding to its control current.

When the brake is operated by the driver while such automatic brake control is being performed, the electronic control device 8 judges whether or not the output hydraulic pressure of the pressure adjusting valve 3 is equal to the hydraulic pressure in the hydraulic pressure supply passage 20. If it judges that they are equal, automatic brake control is stopped. The judgment as to whether they are equal or not may be done by directly detecting both hydraulic pressures and comparing them, or by detecting e.g. the brake operating amount, which is related to the output hydraulic pressure of the pressure adjusting valve 3, and the control currents of the first and second proportional solenoid valves 21 and 22, which are related to the hydraulic pressure of the hydraulic pressure supply passage 20, and indirectly comparing them.

In conventional devices, it was difficult to stop automatic brake control in good timing the moment the output hydraulic pressure of the pressure adjusting valve 3 becomes equal to the hydraulic pressure of the hydraulic pressure supply passage 20. But with the device of this invention, when the output hydraulic pressure of the pressure adjusting valve 3 exceeds the hydraulic pressure in the hydraulic pressure supply passage 20, which is controlled by the first and second proportional solenoid valves 21, 22, the output hydraulic pressure of the pressure adjusting valve 3 is introduced into the hydraulic pressure supply passage 20 through the check valve 23, so that the output hydraulic pressure of the pressure adjusting valve 3 becomes equal to the hydraulic pressure in the hydraulic pressure supply passage 20. Thus, no sudden change in vehicle deceleration will occur due to a shift in the timing of stopping. This reduces any change in deceleration when shifting from automatic brake control to normal braking.

Also, even if a command to stop automatic brake control is not produced from the electronic control device 8 when it is supposed to be produced e.g. due to failure of a hydraulic pressure sensor, the output hydraulic pressure of the pressure adjusting valve 3 will be supplied to the hydraulic pressure supply passage 20, so that the braking force for normal braking is ensured. Thus no lowering of safety will occur.

The vehicle hydraulic brake device of FIG. 1 is a type in which the master cylinder is actuated by the output hydraulic pressure of the pressure adjusting valve and the brake operating force.

In order to further reduce change in deceleration when shifting from automatic brake control to normal braking, the distribution device 10 is preferably set such that the output hydraulic pressure of the pressure adjusting valve 3 becomes substantially equal to the output hydraulic pressure of the master cylinder 4.

Figure 2:
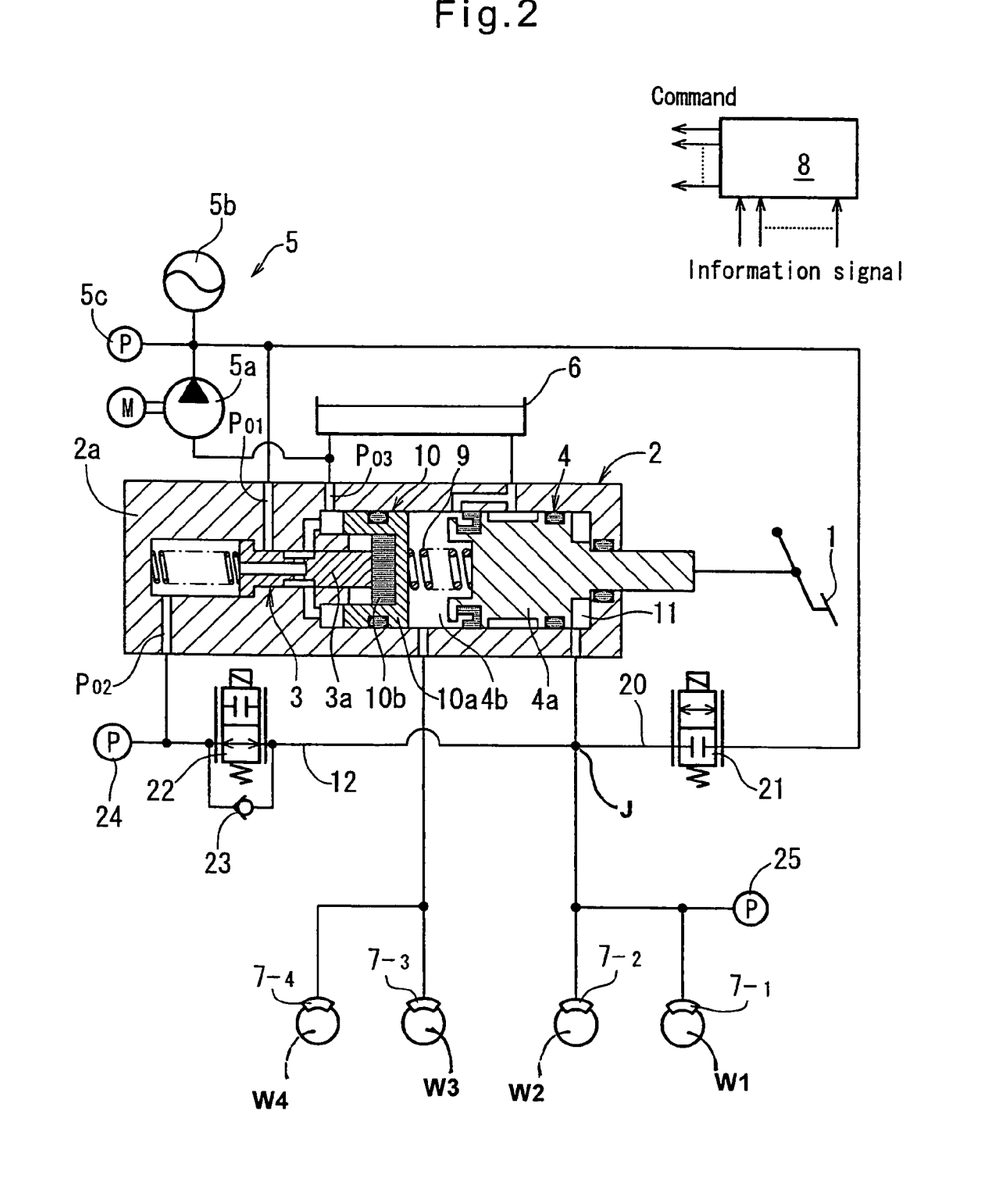
FIG. 2 is a view showing the second embodiment.

FIG. 2 shows the second embodiment which is a type in which the master cylinder is actuated by the output hydraulic pressure of the pressure adjusting valve and the brake operating force. The brake pedal 1, pressure adjusting device 2, pressure adjusting valve 3, master cylinder 4, hydraulic pressure source 5, atmospheric reservoir 6, wheel cylinders 7-1 to 7-4, electronic control device 8 and pressure sensors 24 and 25 which form the vehicle hydraulic brake device of FIG. 2 are the same as those mentioned with respect to FIG. 1. Thus the same numerals as in FIG. 1 are used, and description is omitted.

In the vehicle hydraulic brake device of FIG. 2, a hydraulic pressure supply passage 20 through which the output hydraulic pressure of the hydraulic pressure source 5 is reduced by a first proportional solenoid valve 21 and supplied is connected to a hydraulic pressure passage 12 connecting the pressure adjusting valve 3 to a pressure chamber 11. Further, a second proportional solenoid valve 22 for reducing the hydraulic pressure supplied from the hydraulic pressure supply passage 20 is provided between the pressure adjusting valve 3 and a junction J between the hydraulic pressure supply passage 20 and the hydraulic passage 12. A check valve 23 for allowing fluid flow from the pressure adjusting valve 3 toward the hydraulic pressure supply passage 20 is provided parallel to the second proportional solenoid valve 22 to directly supply the hydraulic pressure produced in the master cylinder 4 into the wheel cylinders 7-3 and 7-4, which are in the second hydraulic line. Thus, the structure is extremely simplified.

With the vehicle hydraulic brake device of FIG. 2, too, when the brake is operated by the driver during automatic brake control performed by use of the first and second proportional solenoid valves 21 and 22, automatic brake control will be stopped when the output hydraulic pressure of the pressure adjusting valve 3 is equal to the hydraulic pressure in the hydraulic pressure supply passage 20, and the mode will be shifted from automatic brake control to normal braking without causing any change in the vehicle deceleration.

Figure 3:
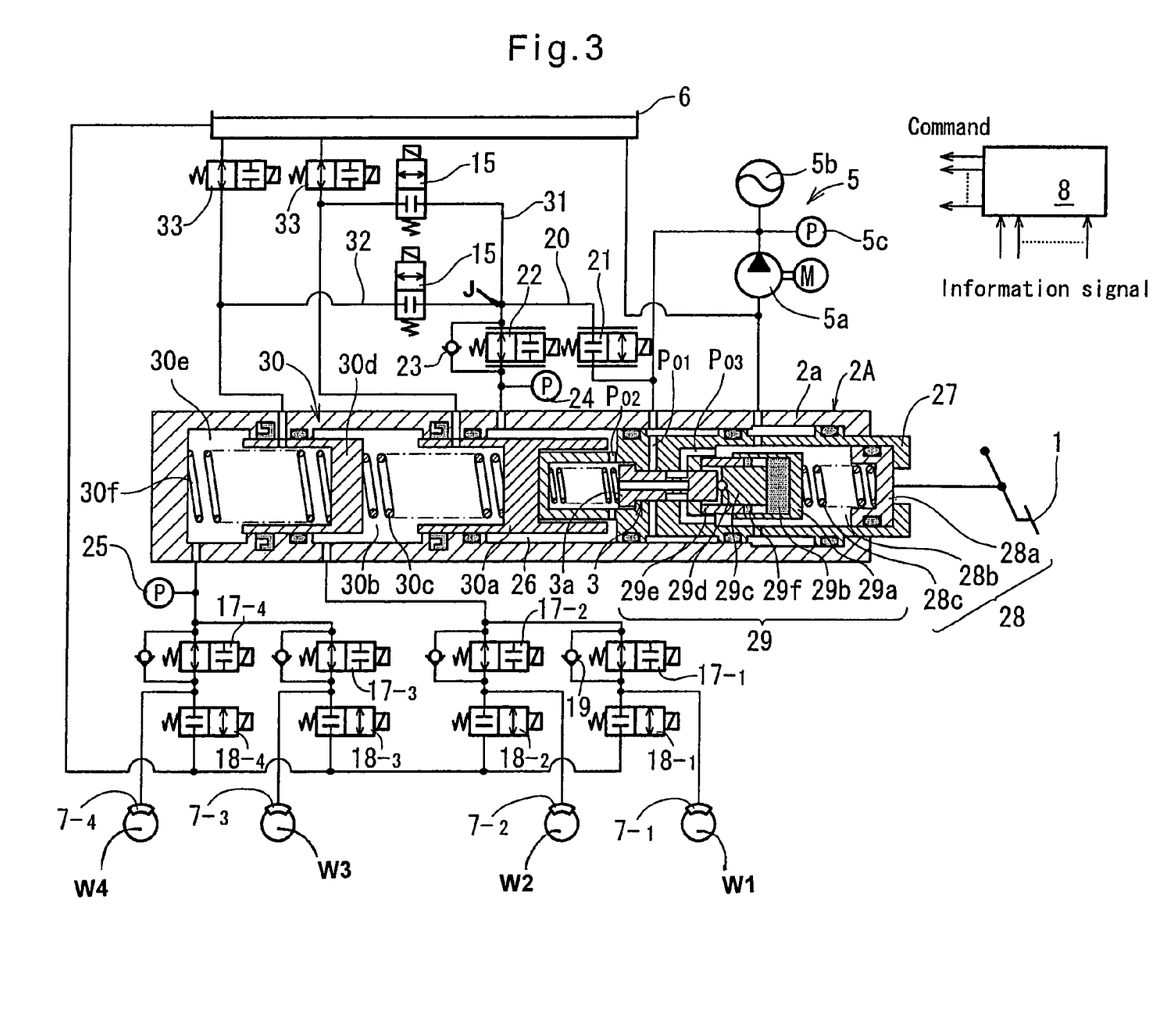
FIG. 3 is a view showing the third embodiment.

FIG. 3 shows the third embodiment which is a type in which in a normal state, the master cylinder is actuated under the output hydraulic pressure of the pressure adjusting valve only. In the vehicle hydraulic brake device of FIG. 3, a pressure adjusting device 2A is used which comprises the pressure adjusting valve 3 and a tandem master cylinder 30. Among other structural elements, for those that are the same as the structural elements of the vehicle hydraulic brake device of FIG. 1, the same numerals as in FIG. 1 are attached and their description is omitted. Only different points from FIG. 1 will be described below.

An auxiliary piston 27 having one end thereof protruding into a pressure chamber 26 is provided in a housing 2a of the pressure adjusting device 2A to transmit the brake operating force applied to the brake pedal 1 through a stroke simulator 28 built in the auxiliary piston 27 and a distribution device 29 to the pressure adjusting valve 3.

The stroke simulator 28 comprises a simulator piston 28a to which the brake operating force is applied from the brake pedal 1, and an elastic member 28c arranged in a simulator chamber 28b, which is at the atmospheric pressure, for imparting a stroke corresponding to the brake operating force to the simulator piston 28a and transmitting the brake operating force to the distribution device 29.

Also, the illustrated distribution device 29 comprises a cup-like member 29a, a rubber member 29b mounted in the member 29a, a transmission member 29c and a steel ball 29d disposed between the rubber member 29b and the pressure adjusting valve 3, a tubular member 29e having one end in abutment with the auxiliary piston 27 and the other end inserted in the cup-like member 29a. (To the tip of the tubular member 29e, a resin annular plate 29f is mounted to protect the rubber member 29b, which is elastically deformed and get into the gap between the cup-like member 29a and the transmission member 29c when the brake is operated.) While this distribution device 29 is slightly different in structure from the distribution device of FIG. 1, there is functionally little difference between them.

In the pressure adjusting valve 3, an input port P01, output port P02 and pressure reducing port P03 are formed in the auxiliary piston 27 with the input port P01 connected to the hydraulic pressure source 5 through a fluid chamber formed on the outer periphery of the auxiliary piston 27, and the output port P02 in communication with the pressure chamber 26.

The tandem master cylinder 30 includes a first master piston 30a, first master hydraulic chamber 30b, return spring 30c for the first master piston 30a, second master piston 30d, second master hydraulic chamber 30e, and return spring 30f for the second master piston 30d. The first master piston 30a of the tandem master cylinder 30 is actuated by the hydraulic pressure in the pressure chamber 26 to produce a first brake hydraulic pressure in the first master hydraulic chamber 30b, while the second master piston 30d is actuated by the first brake hydraulic pressure to produce a second brake hydraulic pressure in the second master hydraulic chamber 30e. The first brake hydraulic pressure is supplied to the wheel cylinders 7-1 and 7-2, which are in the first hydraulic line, and the second brake hydraulic pressure is supplied to the wheel cylinders 7-3 and 7-4, which are in the second hydraulic line.

The vehicle hydraulic brake device of FIG. 3 has two solenoid valves 15 for supplying the output hydraulic pressure of the pressure adjusting valve 3 through the tandem master cylinder 30 to the wheel cylinders 7-1 to 7-4. That is, hydraulic passages 31 and 32 are provided which branch after leaving the pressure chamber 26 and lead to the inlet ports of the first and second master hydraulic chambers 30b and 30e, and the solenoid valves 15 are inserted in these hydraulic passages 31 and 32. Also, a hydraulic pressure supply passage 20 connecting to the output side of the hydraulic pressure source 5 through the first proportional solenoid valve 21 is connected to the branch point of the hydraulic passages 31 and 32 or to a point nearer to the pressure adjusting valve 3 than the branch point. Further, a second proportional solenoid valve 22 and a check valve 23 for allowing fluid flow from the pressure adjusting valve 3 toward the hydraulic pressure supply passage 20 are provided between the hydraulic pressure supply passage 20 and the pressure adjusting valve 3 so as to be parallel to the second proportional solenoid valve 22.

Further, solenoid valves 33 are provided to individually control two fluid lines connecting the atmospheric reservoir 6 to the intake ports of the first and second master hydraulic chambers 30b and 30e at portions nearer to the atmospheric reservoir than the merging point of the hydraulic passages 31 and 32.

With the vehicle hydraulic brake device of FIG. 3, during normal braking, the output hydraulic pressure of the hydraulic pressure source 5 is adjusted by the pressure adjusting valve 3 to a value corresponding to the brake operating amount and supplied to the pressure chamber 26. Under this pressure, the tandem master cylinder 30 is actuated, so that the first and second brake hydraulic pressures, which are produced in the first and second master hydraulic chambers 30b and 30e, are supplied to the wheel cylinders 7-1 to 7-4. At this time, pressure increase or reduction by electronic control performed if necessary is performed using the solenoid valves 17 and 18 with the solenoid valve 15 open and the solenoid valve 33 closed.

If no output hydraulic pressure of the pressure adjusting valve is obtained e.g. due to failure of the hydraulic pressure source 5, no hydraulic pressure is introduced into the pressure chamber 26. Thus the auxiliary piston 27, which receives the brake operating force, is not kept at the illustrated position but is pushed leftwardly in the figure. Thus, the brake operating force is directly transmitted to the first master piston 30a, so that the tandem master cylinder 30 is actuated to perform braking by the output hydraulic pressure of the master cylinder.

On the other hand, pressure increase and reduction during automatic brake control are carried out by means of the first and second proportional solenoid valves 21 and 22. When the solenoid valve 15 and the first proportional solenoid valve 21 are opened and the second proportional solenoid valve 22 and the solenoid valve 33 are closed, the hydraulic pressure from the hydraulic pressure source 5 is reduced to a value corresponding to a control current by the first proportional solenoid valve 21, and supplied to the wheel cylinders 7-1 and 7-2 through the first master hydraulic chamber 30b and to the wheel cylinders 7-3 and 7-4 through the second master hydraulic chamber 30e. Thus braking force will be produced for four wheels. When the first proportional solenoid valve 21 is closed and the second proportional solenoid valve 22 is opened with the solenoid valve 15 open and the solenoid valve 33 closed, hydraulic pressure will be relieved from the pressure chamber 26, which is in communication with the respective master hydraulic chambers, through the pressure adjusting valve 3 to the atmospheric reservoir 6. Thus the hydraulic pressure in the wheel cylinders 7-1 to 7-4 will be reduced to a value corresponding to the control current of the second proportional solenoid valve 22.

In the vehicle hydraulic brake device of FIG. 3, too, a command to stop of automatic brake control is produced from the electronic control device 8 when brake operation is carried out by the driver during automatic brake control and the output hydraulic pressure of the pressure adjusting valve 3 becomes equal to the hydraulic pressure in the hydraulic pressure supply passage 20. The operation at this time is the same as with the vehicle hydraulic brake device of FIG. 1, so that change in deceleration when shifting to normal braking is reduced.

In order to further reduce change in deceleration when shifting to normal braking, the load of the return spring 30c of the first master piston and that of the return spring 30f of the second master piston are preferably set small so that the differential pressure between the output hydraulic pressure of the pressure adjusting valve 3 and the output hydraulic pressure of the master cylinder 4 will become small. Also, when shifted from automatic brake control to normal braking, during one braking before the brake operation is released, preferably, the solenoid valve 15 is opened and the solenoid valve 33 is closed because this prevents any change in the vehicle deceleration.

Figure 4:
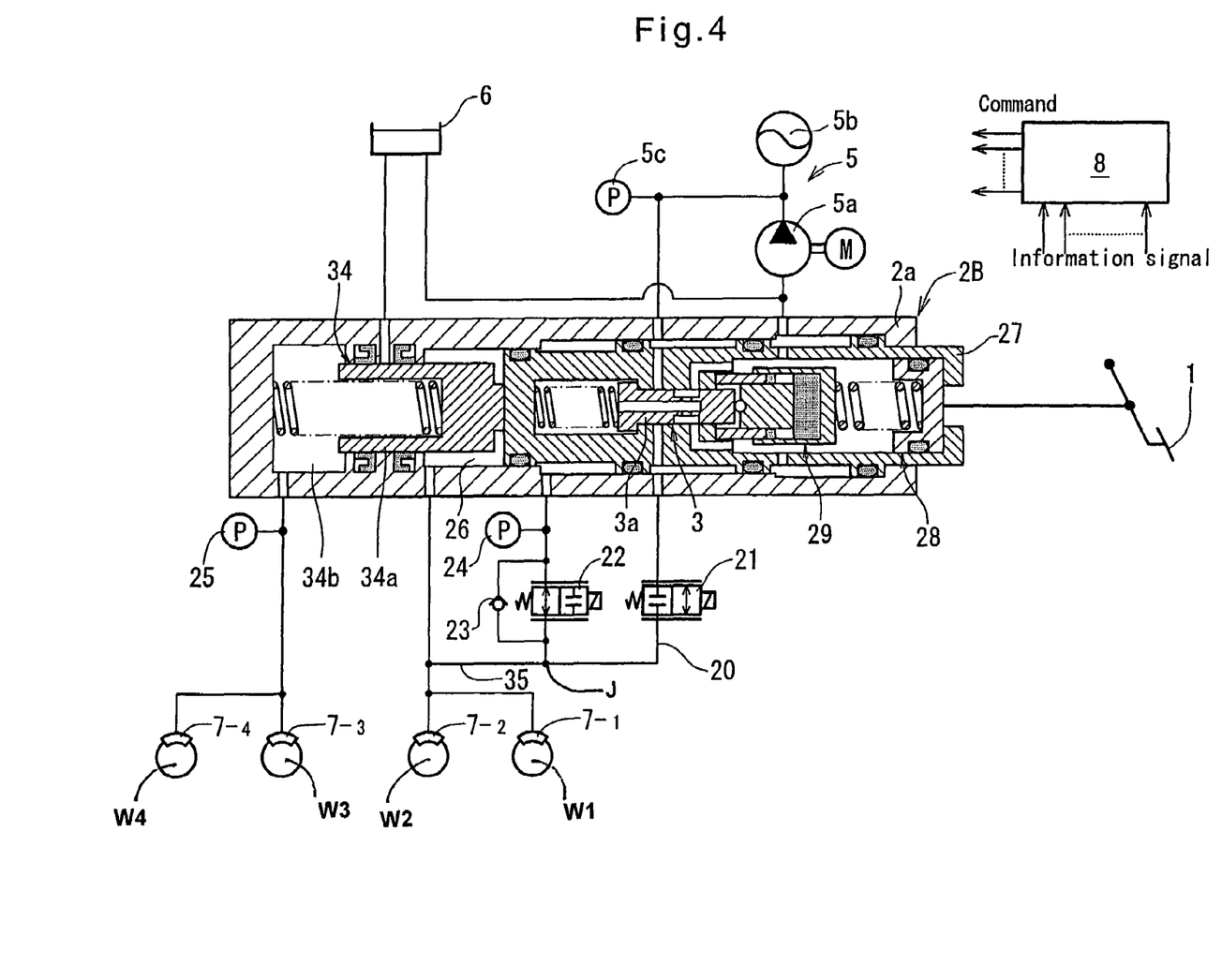
FIG. 4 is a view showing the fourth embodiment.

FIG. 4 shows the embodiment of type in which in a normal state, the master cylinder is actuated under the output hydraulic pressure of the pressure adjusting valve only. In the vehicle hydraulic brake device of FIG. 4, a pressure adjusting device 2B having a master cylinder 34 for generating brake hydraulic pressure in a master hydraulic chamber 34b by actuating a master piston 34a under the output hydraulic pressure of the pressure adjusting valve 3, is used instead of the tandem master cylinder 30 of the pressure adjusting device of FIG. 3, to actuate the wheel cylinders 7-1 and 7-2, which are in the first hydraulic line, with the output hydraulic pressure of the pressure adjusting valve 3, and the wheel cylinders 7-3 and 7-4, which are in the second hydraulic line, with the output hydraulic pressure of the master cylinder 34. Also, a hydraulic pressure supply passage 20 for supplying the output hydraulic pressure of the hydraulic pressure source 5 after reducing with a first proportional solenoid valve 21 is connected to a hydraulic passage 35 which connects the pressure adjusting valve 3 with the pressure chamber 26. Further, a second proportional solenoid valve 22 is disposed between the hydraulic pressure supply passage 20 and the pressure adjusting valve 3. A check valve 23 that allows fluid flow from the pressure adjusting valve 3 toward the hydraulic pressure supply passage 20 is provided parallel to the second proportional solenoid valve 22.

In the vehicle hydraulic brake device of FIG. 4, when the second proportional solenoid valve 22 is closed and the first proportional solenoid valve 21 is opened during automatic brake control, hydraulic pressure from the hydraulic pressure source 5 is reduced by the first proportional solenoid valve 21 and supplied to the wheel cylinders 7-1 and 7-2 and the pressure chamber 26. Further, the master cylinder 34 is actuated under the hydraulic pressure in the pressure chamber 26, so that brake hydraulic pressure corresponding to the hydraulic pressure in the pressure chamber 26 will be generated in the master hydraulic chamber 34b, and supplied to the wheel cylinders 7-3 and 7-4 to impart braking force to the four wheels.

In the vehicle hydraulic brake device of FIG. 4, too, when brake operation is done by the driver during automatic brake control using the first and second proportional solenoid valves 21 and 22, automatic bake control will be stopped while the output hydraulic pressure of the pressure adjusting valve 3 is equal to the hydraulic pressure in the hydraulic pressure supply passage 20, so that the drive mode will be transferred to normal braking without causing change in vehicle deceleration.

Any of the above-described vehicle hydraulic brake devices can perform regenerative cooperative brake control which is performed in an electric vehicle or hybrid vehicle. In any of the brake devices of FIGS. 1, 2 and 4, during regenerative cooperative braking, the braking force generated by the hydraulic pressure supplied from the pressure adjusting device is reduced by an amount corresponding to the regenerative braking force, and during non-regenerative braking, hydraulic pressure supplied to the wheel cylinders are increased by an amount corresponding to the regenerative braking force with the hydraulic pressure supplied from the hydraulic pressure source 5 through the hydraulic pressure supply passage 20.

As described above, the vehicle hydraulic brake device of this invention includes the hydraulic pressure supply passage for reducing the hydraulic pressure of the hydraulic pressure source with the first proportional solenoid valve during automatic brake control to supply it directly to the wheel cylinders or indirectly through the master cylinder to the wheel cylinders, the second proportional solenoid valve for reducing the hydraulic pressure supplied from the hydraulic pressure supply passage, and the check valve provided parallel to the second proportional solenoid valve. Thus, when brake operation is made by the driver during automatic brake control and the output hydraulic pressure of the pressure adjusting valve exceeds the hydraulic pressure in the hydraulic pressure supply passage by automatic brake control, the output hydraulic pressure of the pressure adjusting valve is introduced into the hydraulic pressure supply passage through the check valve until both hydraulic pressures become equal. Thus, automatic brake control will never be stopped in a situation in which there is a difference between the output hydraulic pressure of the pressure adjusting valve and the hydraulic pressure in the hydraulic pressure supply line. Thus it is possible to reduce any change in deceleration when transferring from automatic brake control to normal braking.

Also, even if a situation occurs in which automatic brake control is not stopped when it is supposed to be stopped e.g. due to failure of a hydraulic pressure sensor, since braking force corresponding to normal braking is ensured, safety will improve.

What is claimed is:

1. A hydraulic brake device comprising a hydraulic pressure source for generating and outputting a predetermined hydraulic pressure, the hydraulic pressure source including a power-driven pump for producing hydraulic pressure and a pressure accumulator for accumulating hydraulic pressure produced by the pump, a pressure adjusting valve including a pressure adjusting mechanism for adjusting the output hydraulic pressure of said hydraulic pressure source to a value corresponding to a brake operating amount of a brake operating member, and wheel cylinders actuated by the output hydraulic pressure of said pressure adjusting valve for imparting braking force to wheels of a vehicle, further comprising a hydraulic passage leading from said pressure adjusting valve to said wheel cylinders, a hydraulic pressure supply passage for supplying hydraulic pressure from said hydraulic pressure source to said hydraulic passage at a junction therewith, the hydraulic pressure supply passage by-passing the pressure adjusting mechanism of the pressure adjusting valve, a first proportional solenoid valve provided in said hydraulic pressure supply passage for reducing the output hydraulic pressure of said hydraulic pressure source before being supplied to said hydraulic passage, a second proportional solenoid valve provided in said hydraulic passage at a location between said pressure adjusting valve and said junction and operable for reducing the output hydraulic pressure supplied from said hydraulic pressure supply passage, a check valve provided in parallel to said second proportional solenoid valve for allowing fluid flow from said pressure adjusting valve to said junction while bypassing said second proportional solenoid valve, an atmospheric reservoir communicating with said hydraulic passage through said pressure adjusting valve during automatic brake control, and a controller for controlling said first and second proportional solenoid valves, each of said first and second proportional solenoid valves being of the type in which a differential pressure between upstream hydraulic pressure and downstream hydraulic pressure thereof is controllable to a value corresponding to a control current applied thereto, wherein said controller controls said first proportional solenoid valve during automatic brake control to increase the hydraulic pressure in the wheel cylinders and controls said second proportional solenoid valve during automatic brake control to decrease the hydraulic pressure in the wheel cylinders by communicating the wheel cylinders with said atmospheric reservoir through said second proportional solenoid valve and said pressure adjusting valve, and wherein when the output hydraulic pressure of said pressure adjusting valve exceeds the hydraulic pressure in the wheel cylinders in response to operation of the brake operating member during the automatic brake control, the output hydraulic pressure of said pressure adjusting valve is supplied into the wheel cylinders through the check valve.

2. A hydraulic brake device comprising a hydraulic pressure source for generating and outputting a predetermined hydraulic pressure, the hydraulic pressure source including a power-driven pump for producing hydraulic pressure and a pressure accumulator for accumulating hydraulic pressure produced by the pump, a pressure adjusting valve including a pressure adjusting mechanism for adjusting the output hydraulic pressure of said hydraulic pressure source to a value corresponding to a brake operating amount of a brake operating member, a pressure chamber connected to said pressure adjusting valve, a master cylinder including a master piston actuated by the output hydraulic pressure of said pressure adjusting valve introduced into said pressure chamber or the output hydraulic pressure of said pressure adjusting valve introduced into said pressure chamber and the brake operating force applied to the brake operating member for generating brake hydraulic pressure, and wheel cylinders actuated by the output hydraulic pressure of said master cylinder for imparting braking force to wheels of a vehicle, further comprising a hydraulic system leading from said master cylinder to said wheel cylinders, a hydraulic passage connecting said pressure adjusting valve to said hydraulic system, a solenoid valve in said hydraulic passage, a hydraulic pressure supply passage for supplying hydraulic pressure from said hydraulic pressure source to said hydraulic passage at a junction therewith located upstream of said solenoid valve, the hydraulic pressure supply passage by-passing the pressure adjusting mechanism of the pressure adjusting valve, a first proportional solenoid valve provided in said hydraulic pressure supply passage for reducing the output hydraulic pressure of said hydraulic pressure source before being supplied to said hydraulic passage, a second proportional solenoid valve provided in said hydraulic passage at a location between said pressure adjusting valve and said junction and operable for reducing hydraulic pressure supplied from said hydraulic pressure supply passage, a check valve provided in parallel to said second proportional solenoid valve for allowing fluid flow from said pressure adjusting valve to said junction while bypassing said second proportional solenoid valve, an atmospheric reservoir communicating with said hydraulic passage through said pressure adjusting valve during automatic brake control, and a controller for controlling said first and second proportional solenoid valves, each of said first and second proportional solenoid valves being of the type in which a differential pressure between upstream hydraulic pressure and downstream hydraulic pressure thereof is controllable to a value corresponding to a control current applied thereto, wherein said controller controls said solenoid valve and said first proportional solenoid valve during automatic brake control to increase the hydraulic pressure in the wheel cylinders and controls said second proportional solenoid valve during automatic brake control to decrease the hydraulic pressure in the wheel cylinders by communicating the wheel cylinders with said atmospheric reservoir through said second proportional solenoid valve and said pressure adjusting valve, and wherein when the output hydraulic pressure of said pressure adjusting valve exceeds the hydraulic pressure in the wheel cylinders in response to operation of the brake operating member during the automatic brake control, the output hydraulic pressure of said pressure adjusting valve is supplied into the wheel cylinders through the check valve.

3. A hydraulic brake device comprising a hydraulic pressure source for generating and outputting a predetermined hydraulic pressure, the hydraulic pressure source including a power-driven pump for producing hydraulic pressure and a pressure accumulator for accumulating hydraulic pressure produced by the pump, a pressure adjusting valve including a pressure adjusting mechanism for adjusting the output hydraulic pressure of said hydraulic pressure source to a value corresponding to a brake operating amount of a brake operating member, a pressure chamber connected to said pressure adjusting valve, a master cylinder including a master piston actuated by the output hydraulic pressure of said pressure adjusting valve introduced into said pressure chamber or the output hydraulic pressure of said pressure adjusting valve introduced into said pressure chamber and the brake operating force applied to the brake operating member for generating brake hydraulic pressure, and wheel cylinders actuated by the output hydraulic pressure of said master cylinder for imparting braking force to wheels of a vehicle, further comprising a hydraulic passage connecting said pressure adjusting valve to said pressure chamber, a hydraulic pressure supply passage for supplying hydraulic pressure from said hydraulic pressure source to said hydraulic passage at a junction therewith, the hydraulic pressure supply passage bypassing the pressure adjusting mechanism of the pressure adjusting valve, a first proportional solenoid valve provided in said hydraulic pressure supply passage for reducing the output hydraulic pressure of said hydraulic pressure source before being supplied to said hydraulic passage, a second proportional solenoid valve provided in said hydraulic passage at a location between said pressure adjusting valve and said junction and operable for reducing the hydraulic pressure supplied from said hydraulic pressure supply passage, a check valve provided in parallel to said second proportional solenoid valve for allowing fluid flow from said pressure adjusting valve to said junction while bypassing said second proportional solenoid valve, an atmospheric reservoir communicating with said hydraulic passage through said pressure adjusting valve during automatic brake control, and a controller for controlling said first and second proportional solenoid valves, each of said first and second proportional solenoid valves being of the type in which a differential pressure between upstream hydraulic pressure and downstream hydraulic pressure thereof is controllable to a value corresponding to a control current applied thereto, wherein said controller controls said first proportional solenoid valve during automatic brake control to increase the hydraulic pressure in the wheel cylinders through said first proportional solenoid valve and controls said second proportional solenoid valve during automatic brake control to decrease the hydraulic pressure in the wheel cylinders by communicating the pressure chamber with said atmospheric reservoir through said second proportional solenoid valve and said pressure adjusting valve, and wherein when the output hydraulic pressure of said pressure adjusting valve exceeds the hydraulic pressure in the pressure chamber in response to operation of the brake operating member during the automatic brake control, the output hydraulic pressure of said pressure adjusting valve is supplied into the pressure chamber through the check valve.

4. A hydraulic brake device as claimed in claim 1, further comprising a detector for detecting that the output hydraulic pressure of said pressure adjusting valve has become equal to the hydraulic pressure of said hydraulic pressure supply passage, and wherein when it is detected by said detector that the output hydraulic pressure of said pressure adjusting valve has become equal to the hydraulic pressure of said hydraulic pressure supply passage, automatic brake control is stopped.

5. A hydraulic brake device as claimed in claim 2, further comprising a detector for detecting that the output hydraulic pressure of said pressure adjusting valve has become equal to the hydraulic pressure of said hydraulic pressure supply passage, and wherein when it is detected by said detector that the output hydraulic pressure of said pressure adjusting valve has become equal to the hydraulic pressure of said hydraulic pressure supply passage, automatic brake control is stopped.

6. A hydraulic brake device as claimed in claim 3, further comprising a detector for detecting that the output hydraulic pressure of said pressure adjusting valve has become equal to the hydraulic pressure of said hydraulic pressure supply passage, and wherein when it is detected by said detector that the output hydraulic pressure of said pressure adjusting valve has become equal to the hydraulic pressure of said hydraulic pressure supply passage, automatic brake control is stopped.

7. A hydraulic brake device as claimed in claim 1, further comprising a wheel cylinder pressure detector for detecting the hydraulic pressure of said wheel cylinders, and wherein when it is detected that the hydraulic pressure of said wheel cylinders is higher than the hydraulic pressure controlled by said first proportional solenoid valve and said second proportional solenoid valve, automatic brake control is stopped.

8. A hydraulic brake device as claimed in claim 2, further comprising a wheel cylinder pressure detector for detecting the hydraulic pressure of said wheel cylinders, and wherein when it is detected that the hydraulic pressure of said wheel cylinders is higher than the hydraulic pressure controlled by said first proportional solenoid valve and said second proportional solenoid valve, automatic brake control is stopped.

9. A hydraulic brake device as claimed in claim 3, further comprising a wheel cylinder pressure detector for detecting the hydraulic pressure of said wheel cylinders, and wherein when it is detected that the hydraulic pressure of said wheel cylinders is higher than the hydraulic pressure controlled by said first proportional solenoid valve and said second proportional solenoid valve, automatic brake control is stopped.

* * * * *